(12) United States Patent
Tong et al.

(10) Patent No.: US 12,449,679 B2
(45) Date of Patent: Oct. 21, 2025

(54) WEARABLE DEVICES AND WEARING MEMBERS THEREOF

(71) Applicant: SHENZHEN SHOKZ CO., LTD., Guangdong (CN)

(72) Inventors: Peigeng Tong, Shenzhen (CN); Xin Fu, Shenzhen (CN); Zhen Wang, Shenzhen (CN); Zhiqing Liu, Shenzhen (CN); Lei Zhang, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 268 days.

(21) Appl. No.: 18/450,389

(22) Filed: Aug. 15, 2023

(65) Prior Publication Data

US 2023/0388689 A1 Nov. 30, 2023

Related U.S. Application Data

(63) Continuation of application No. PCT/CN2022/139086, filed on Dec. 14, 2022.

(30) Foreign Application Priority Data

Jan. 14, 2022 (WO) ................ PCT/CN2022/072151
Jan. 27, 2022 (CN) ......................... 202210101579.5

(Continued)

(51) Int. Cl.
*G02C 11/00* (2006.01)
*H04R 1/02* (2006.01)
*H04R 1/08* (2006.01)

(52) U.S. Cl.
CPC ............. *G02C 11/10* (2013.01); *H04R 1/028* (2013.01); *H04R 1/08* (2013.01)

(58) Field of Classification Search
CPC ........... G02C 11/10; H04R 1/028; H04R 1/08
(Continued)

(56) References Cited

U.S. PATENT DOCUMENTS 2,952,748 A * 9/1960 Posen ................. H01M 50/216
351/158
11,678,102 B2 * 6/2023 Li ......................... H04R 1/1075
381/74

(Continued)

FOREIGN PATENT DOCUMENTS

CN 203720476 U 7/2014
CN 106226920 A 12/2016
(Continued)

OTHER PUBLICATIONS

Notice of Reasons for Refusal in Japanese Application No. 2023558275 mailed on Nov. 12, 2024, 20 pages.
(Continued)

*Primary Examiner* — Sean H Nguyen
(74) *Attorney, Agent, or Firm* — METIS IP LLC (57) ABSTRACT

The present disclosure discloses a wearable device and a wearing member thereof. The wearing member includes: a housing including a concave section, the concave section forms a downward hollow in a wearing state, and the hollow includes a first sound pickup hole for an input of a sound; and a first sound pickup member disposed in the concave section and configured to pick up the sound input through the first sound pickup hole. In such cases, the wearing member provided by the present disclosure may improve the quality of a picked-up sound by reducing a wind noise interference, thereby improving the voice control efficiency of a user to the wearing member or call quality of the wearable device.

20 Claims, 5 Drawing Sheets

(30) Foreign Application Priority Data

Jan. 27, 2022 (CN) .......................... 202210101580.8
Jan. 27, 2022 (CN) .......................... 202220233972.5
Jan. 27, 2022 (CN) .......................... 202220235657.6

(58) Field of Classification Search
USPC ........................................................ 381/122
See application file for complete search history.

(56) References Cited

U.S. PATENT DOCUMENTS

| | | |
|---|---|---|
| 2008/0008344 A1 | 1/2008 | Wakabayashi et al. |
| 2013/0142351 A1 | 6/2013 | Andersen |
| 2013/0208923 A1 | 8/2013 | Suvanto |
| 2023/0229025 A1 | 7/2023 | Tong et al. |

FOREIGN PATENT DOCUMENTS

| | | | |
|---|---|---|---|
| CN | 210183483 U | 3/2020 | |
| CN | 111562676 A | 8/2020 | |
| CN | 212034322 U | 11/2020 | |
| CN | 212649672 U | 3/2021 | |
| CN | 213485164 U | 6/2021 | |
| CN | 213547788 U | 6/2021 | |
| CN | 214704204 U | 11/2021 | |
| CN | 215932289 U | 3/2022 | |
| JP | H0520491 U | 3/1993 | |
| WO | WO-2022110957 A1 * | 6/2022 | ........... H04R 1/1066 |

OTHER PUBLICATIONS

International Search Report in PCT/CN2022/139086 mailed on Feb. 21, 2023, 7 pages.
International Search Report in PCT/CN2022/072151 mailed on Oct. 10, 2022, 5 pages.

* cited by examiner

WEARABLE DEVICES AND WEARING MEMBERS THEREOF

CROSS-REFERENCE TO RELATED APPLICATIONS

This application is a continuation of International Application No. PCT/CN2022/139086, filed on Dec. 14, 2022, which claims priority of four Chinese Patent Applications No. 202220235657.6, No. 202220233972.5, No. 202210101580.8, and No. 202210101579.5, filed on Jan. 27, 2022, entitled "Wearable Devices and Wearing Members Thereof", the International Application No. PCT/CN2022/139086 also claims priority of International Application No. PCT/CN2022/072151, entitled "Wearable Devices" filed on Jan. 14, 2022, the entire contents of each of which are incorporated herein by reference.

TECHNICAL FIELD

The present disclosure relates to the technical field of wearable devices, and in particular, to a wearable device and a wearing member thereof.

BACKGROUND

After the first release of Google Glass by Google in 2012, the concept of wearable devices such as smart glasses have become familiar to the public. Nowadays, relatively mature wearable devices may include smart watches, VR/AR head displays, smart glasses, etc.

In a motion scene of a pair of existing smart glasses, due to the rapid movement of a user, the wind noise interference is more obvious when a sound is picked up, which makes the quality of a sound pickup poor and is not conducive to the user's control.

SUMMARY

The present disclosure mainly provides a wearable device and a wearing member thereof, so as to solve the problem that the wearable device is affected by a wind noise when picking up a sound in a motion scene.

In order to solve the above technical problem, a technical solution adopted by the present disclosure is to provide a wearing member. The wearing member includes a housing, including a first sound pickup hole for an input of a sound and a first sound pickup member disposed in the housing and configured to pick up the sound input through the first sound pickup hole.

In some embodiments, the housing includes a concave portion, and the concave portion forms a downward hollow in a wearing state, and the first sound pickup hole is disposed at the hollow, and the first sound pickup member is disposed in the concave portion.

In some embodiments, the first sound pickup hole is disposed at a bottom of the hollow; or the first sound pickup hole is disposed at a waist of the hollow.

In some embodiments, the concave portion includes a first bending portion and a second bending portion connected through a bending connection, and the hollow is formed between a top wall of the first bending portion and a top wall of the second bending portion; and the concave portion further includes a first side and a second side which are connected to two side edges of the top wall of the first bending portion and the top wall of the second bending portion and are opposite to each other, and a distance between the first sound pickup hole and the first side is smaller than a distance between the first sound pickup hole and the second side; wherein the first side is configured to face a user's head.

In some embodiments, the wearing member further includes a noise-reducing member, the noise-reducing member is disposed in the concave portion and includes a noise-reducing channel, and one end of the noise-reducing channel is aligned with the first sound pickup hole; and the first sound pickup member is aligned with another end of the noise-reducing channel.

In some embodiments, the noise-reducing channel includes one or more noise-reducing chambers and a transmission channel connecting the one or more noise-reducing chambers, and a size of a cross section of a noise-reducing chamber of the one or more noise-reducing chambers perpendicular to an extension direction of the noise-reducing channel is larger than a size of a cross section of the transmission channel.

In some embodiments, the one or more noise-reducing chambers of the noise-reducing member include at least two noise-reducing chambers spaced apart from each other, and the at least two noise-reducing chambers communicate with each other through the transmission channel.

In some embodiments, a ratio of a length of two adjacent noise-reducing chambers of the at least two noise-reducing chambers along the extension direction of the noise-reducing channel to a length of the transmission channel between the two adjacent noise-reducing chambers along the extension direction of the noise-reducing channel is greater than or equal to 1.5.

In some embodiments, a noise-reducing chamber of the one or more noise-reducing chambers is disposed on one end of the noise-reducing member, the noise-reducing chamber forms an end opening at the end of the noise-reducing member, and the end of the noise-reducing member abuts against an inner wall of the concave section such that the sound input through the first sound pickup hole directly enters the noise-reducing chamber.

In some embodiments, a noise-reducing chamber of the one or more noise-reducing chambers forms a lateral opening on a side of the noise-reducing member, and the noise-reducing member abuts against an inner wall of the housing to cover the lateral opening of the noise-reducing chamber.

In some embodiments, the noise-reducing chamber further accommodates a porous layer; and/or, the transmission channel is disposed inside the porous layer; and/or, the noise-reducing member is a porous body.

In some embodiments, a second sound pickup hole is further disposed on the housing, the wearing member includes a second sound pickup member, and the second sound pickup member is disposed in the housing and is configured to pick up the sound through the second sound pickup hole; wherein an orientation of the second sound pickup hole is different from an orientation of the first sound pickup hole.

In some embodiments, the first sound pickup hole is disposed on the bottom of the hollow, and the noise-reducing member and the first sound pickup member are both disposed in the first bending portion; and the wearing member further includes a speaker and a controller, the wearing member further includes a speaker and a controller, the speaker is disposed in the second bending portion, the controller is disposed in the first bending portion, and the speaker and the controller are located on two sides of the noise-reducing member and the first sound pickup member, respectively; both the speaker and the first sound pickup member are electrically connected to the controller.

In some embodiments, one end of the second bending portion away from the first bending portion includes the second sound pickup hole, and the wearing member includes the second sound pickup member, the second sound pickup member is disposed on the second bending portion and is located at one end of the speaker away from the first sound pickup member, and the second sound pickup member is configured to pick up the sound through the second sound pickup hole; wherein the orientation of the second sound pickup hole is different from the orientation of the first sound pickup hole.

In order to solve the above technical problems, another technical solution adopted by the present disclosure is to provide a wearable device. The wearable device includes a visual member and the wearing member, and the wearing member is connected to the visual member.

The beneficial effects of the present disclosure include: different from the prior art, the present disclosure discloses a wearable device and a wearing member thereof. By disposing the first sound pickup hole at the hollow of the concave portion, a protective structure formed by the concave portion at the hollow may be obtained such that the first sound pickup hole located at the hollow is less affected by an airflow outside the hollow and the sound input through the first sound pickup hole is also less affected by a wind noise caused by the airflow. Therefore, a wind noise interference during a sound pickup is relatively weakened, thereby improving the quality of the sound pickup and improving a voice control efficiency of a user to the wearing member or call quality of the wearing member.

BRIEF DESCRIPTION OF THE DRAWINGS

In order to more clearly illustrate the technical solutions in the embodiments of the present disclosure or the prior art, the following will briefly introduce the drawings that need to be used in the description of the embodiments or the prior art. Obviously, the accompanying drawings in the following description are only some embodiments of the present disclosure. For those of ordinary skill in the art, other drawings may also be obtained according to these drawings without creative work, wherein.

DETAILED DESCRIPTION

The following will clearly and completely describe the technical solutions in the embodiments of the present disclosure with reference to the accompanying drawings in the embodiments of the present disclosure. Obviously, the described embodiments are only part of the embodiments of the present disclosure, not all of them. Based on the embodiments in the present disclosure, all other embodiments obtained by those skilled in the art without making creative efforts belong to the scope of protection of the present disclosure.

The terms "first," "second," and "third" in the embodiments of the present disclosure are used for description purposes only, and cannot be understood as indicating or implying relative importance or implicitly indicating the quantity of indicated technical features. Thus, features defined as "first," "second," and "third" may explicitly or implicitly include at least one of these features. In the description of the present disclosure, "a plurality of" means at least two, such as two, three, etc., unless otherwise specifically defined. Furthermore, the terms "include" and "have", as well as any variations thereof, are intended to cover a non-exclusive inclusion. For example, a process, method, system, product, or device comprising a series of steps or units is not limited to the listed steps or units, but optionally also includes unlisted steps or units, or optionally further includes other steps or units inherent in these processes, methods, products or devices.

The "embodiment" in the present disclosure means that a particular feature, structure, or characteristic described in connection with the embodiment can be included in at least one embodiment of the present disclosure. The occurrences of this phrase in various places in the present disclosure are not necessarily all referring to the same embodiment, nor are separate or alternative embodiments mutually exclusive of other embodiments. It is understood explicitly and implicitly by those skilled in the art that the embodiments described herein can be combined with other embodiments.

Figure 1:
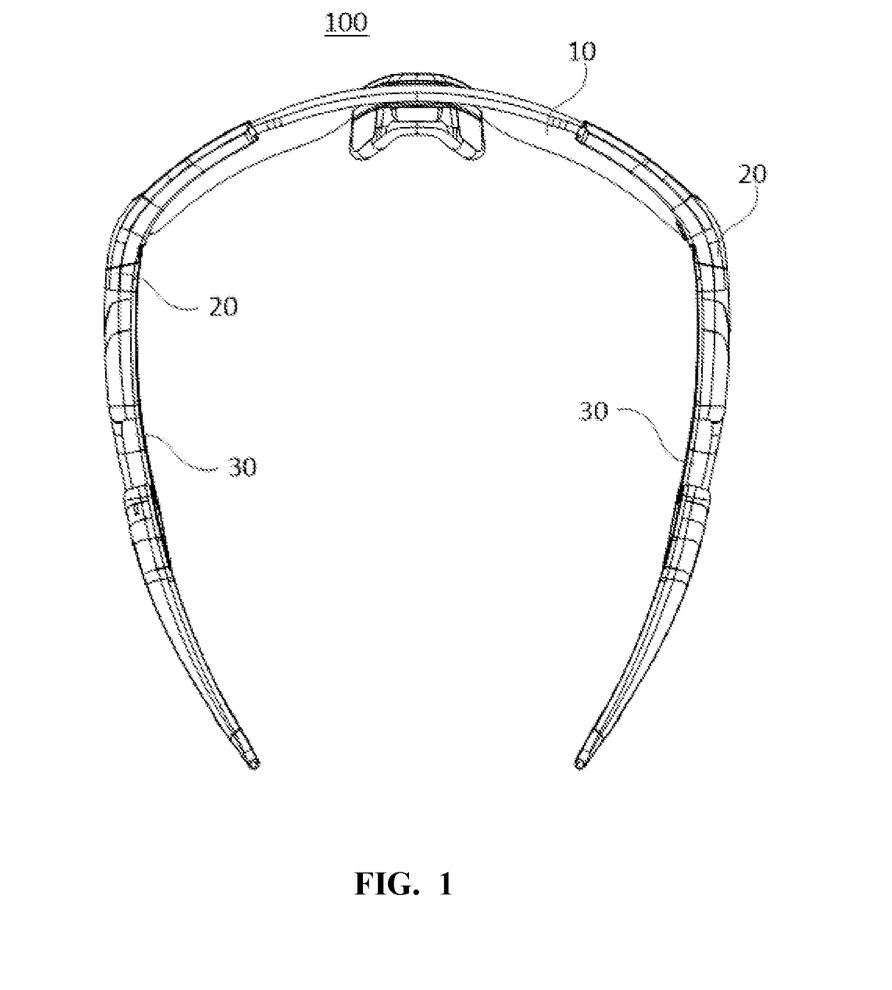
FIG. 1 is a schematic diagram illustrating an exemplary embodiment of a wearable device provided by the present disclosure.
Figure 2:
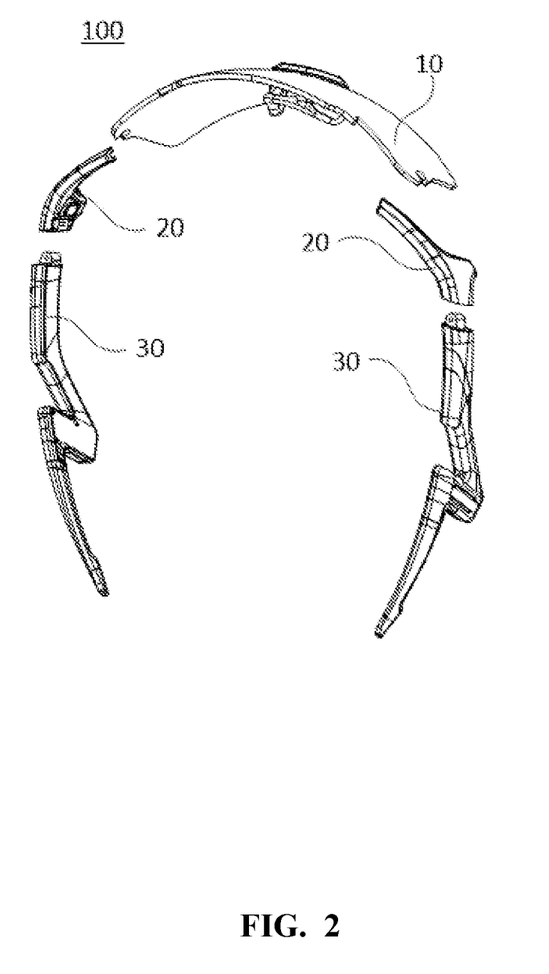
FIG. 2 is a schematic diagram illustrating an exemplary decomposed structure of the wearable device shown in FIG. 1.

The present disclosure provides a wearable device 100, referring to FIG. 1 and FIG. 2, FIG. 1 is a schematic diagram illustrating an exemplary embodiment of a wearable device provided in the present disclosure, and FIG. 2 is a schematic diagram illustrating an exemplary decomposed structure of the wearable device shown in FIG. 1.

The wearable device 100 may include a pair of glasses, a smart bracelet, an earphone, a hearing aid, a smart helmet, a smartwatch, smart clothing, a smart backpack, a smart accessory, etc., or any combination thereof. For example, the wearable device 100 may include a pair of functional myopia glasses, a pair of presbyopic glasses, a pair of cycling glasses, a pair of sunglasses, etc., or the wearable device 100 may include a pair of intelligent glasses, such as a pair of audio glasses with an earphone function. The wearable device 100 may also include a headset device such as a helmet, an augmented reality (AR) device, a virtual reality (VR) device, etc.

In some embodiments, the AR device or the VR device may include a VR helmet, a pair of VR glasses, an AR helmet, a pair of AR glasses, etc., or any combination thereof. For example, the VR device and/or the AR device may include Google Glass, Oculus Rift, Hololens, Gear VR, etc.

The wearable device 100 includes a visual member 10, a quick disassembly component(s) and a wearing member(s) 30, the visual member 10 and the wearing member 30 may be connected to two ends of the quick disassembly component 20, respectively. The visual member and the wearing member 30 may both be quickly disassembled from the quick disassembly component 20, and the wearing member 30 may also be disposed with the quick disassembly component 20 as a conventional connection structure or an integrated structure.

In some embodiments, the wearable device 100 may be a headset device, the visual member 10 may include a lens, a display screen, or a display screen with a lens function. The visual member 10 may further include a lens and an auxiliary part thereof or a display screen and an auxiliary part thereof. The auxiliary part may include a glass frame or a frame, etc. such that the visual member 10 may be interconnected with the quick disassembly component 20.

Optionally, the visible member 10 may also include a dial structure with a display function.

In some embodiments, the wearable device 100 may include a pair of glasses, the visual member 10 may include a lens, and the wearing member 30 may include a temple. The wearable device 100 may include the visual member 10, two sets of quick disassembly components 20, and two sets of wearing members 30, wherein the two sets of quick disassembly components 20 may be disposed at both ends of the visual member 10, and the two sets of wearing members 30 may be connected with a corresponding set of quick disassembly components 20.

Optionally, the wearing member 30 may also include a headband, a watch strap, etc., and two ends of the wearing member 30 may be connected with the corresponding set of quick disassembly components 20 respectively. In some embodiments, one end of the wearing member may be connected with a set of quick disassembly components 20, and another end may be directly connected with the visual member 10.

In other embodiments, the wearable device 100 may not include the quick disassembly component 20 such that two ends of the visual member 10 may be directly connected with the wearing members 30.

In other words, the wearing member 30 may be directly connected with the visual member or indirectly connected with the visual member 10 through the quick disassembly component 20.

Figure 3:
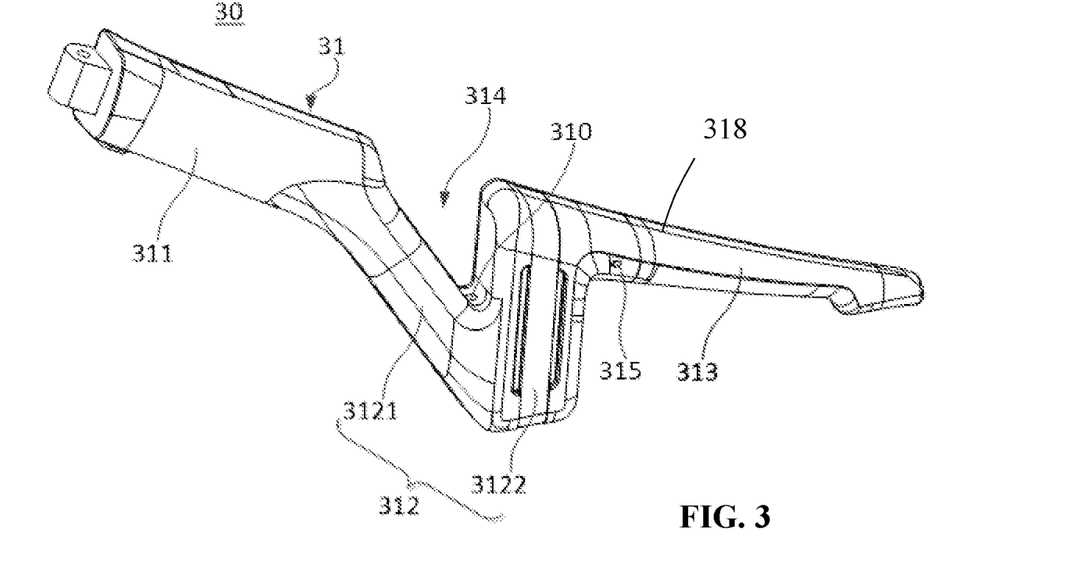
FIG. 3 is a schematic diagram illustrating an exemplary axial structure of a wearing member in the wearable device shown in FIG. 2.
Figure 4:
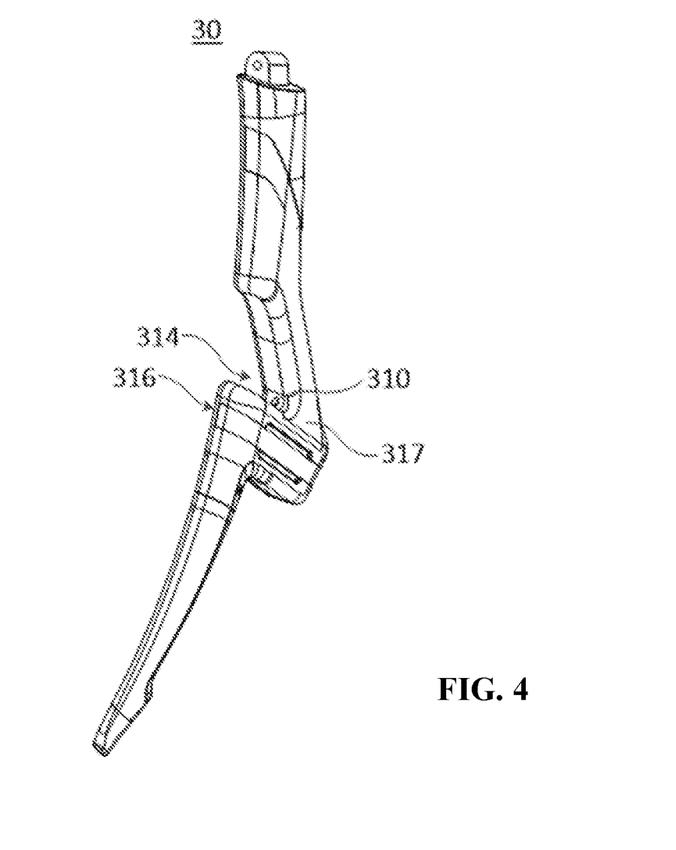
FIG. 4 is a schematic diagram illustrating another exemplary axial structure of the wearing member shown in FIG. 3.
Figure 5:
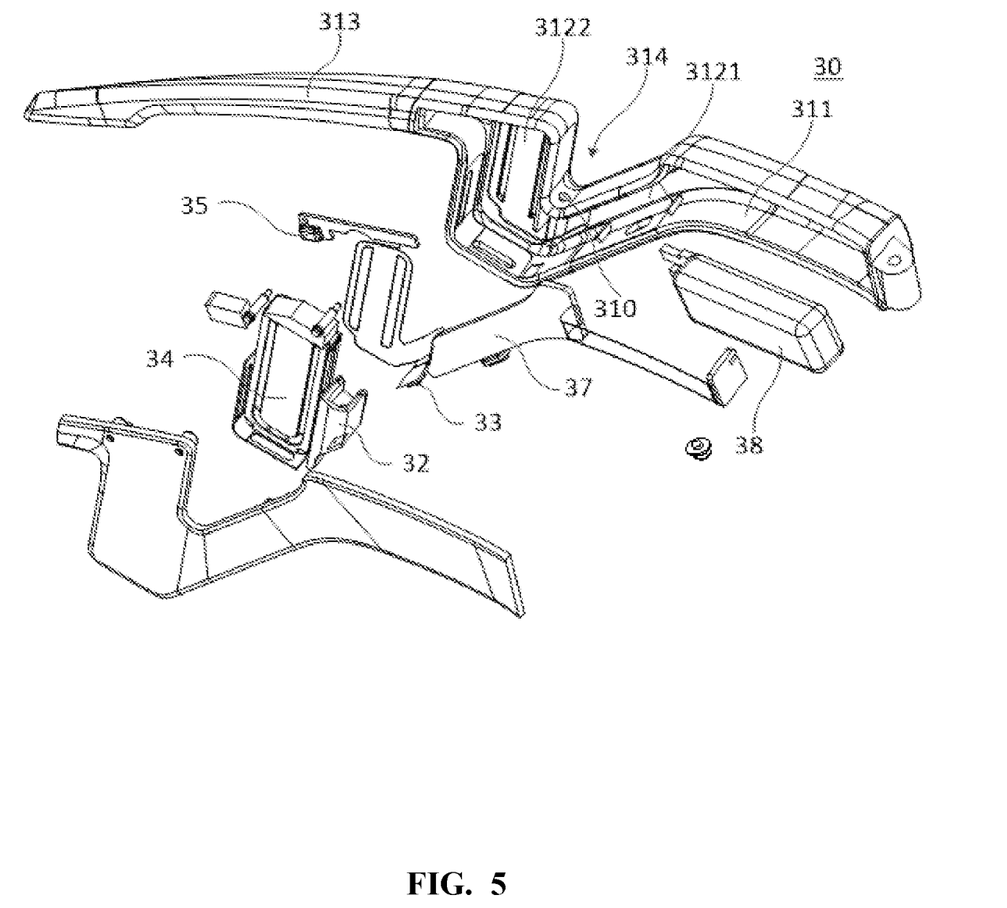
FIG. 5 is a schematic diagram illustrating an exemplary decomposed structure of the wearing member shown in FIG. 3.

Referring to FIG. 2 to FIG. 5, FIG. 3 is a schematic diagram illustrating an exemplary axial structure of a wearing member in the wearable device shown in FIG. 2, FIG. 4 is a schematic diagram illustrating another exemplary axial structure of the wearing member shown in FIG. 3, and FIG. 5 is a schematic diagram illustrating an exemplary decomposed structure of the wearing member shown in FIG. 3.

In some embodiments, the wearing member 30 includes a housing 31, a noise-reducing member 32, and a first sound pickup member 33. The noise-reducing member 32 and the first sound pickup member 33 are all disposed in the housing 31, and the first sound pickup member 33 is configured to pick up a sound passing through the noise-reducing member 32.

Specifically, the housing 31 includes a first sound pickup hole 310 for inputting a sound; the noise-reducing member 32 is disposed in the housing 31 and includes a noise-reducing channel 320, and one end of the noise-reducing channel 320 is aligned with the first sound pickup hole 310; the first sound pickup member 33 is disposed in the housing 31 and aligned with another end of the noise-reducing channel 320 for picking up the sound passing through the noise-reducing channel 320. The noise-reducing channel 320 may reduce a wind noise to facilitate the usage of the wearable device 100 in a moving scene.

In some embodiments, the housing 31 includes a first connecting section 311, a concave section 312, and a second connecting section 313 which are sequentially connected, wherein an end of the first connecting section 311 away from the concave section 312 is hinged to the quick disassembly component 20, the second connecting section 313 is configured to hang on an auricle of a user, a hollow 314 is formed in the concave section 312, the concave section 312 is a hollow section, and a plurality of electrical components may be disposed in the concave section 312.

Taking a scene where the user wears the wearable device 100 as an example, in a wearing state, the concave section 312 forms the downward hollow 314, that is, the concave section 312 may extend toward an opening of an ear canal such that a sound guiding hole disposed on the concave section 312 may be close to the opening of the ear canal to facilitate a transmission of the sound to the user.

Optionally, the housing 31 may only include the concave section 312 and the second connecting section 313, wherein the concave section 312 is hinged to the quick disassembly component 20.

Optionally, the housing 31 may have a shape of a straight or wavy, etc.

In some embodiments, the first sound pickup hole 310 is disposed at the hollow 314 on the housing 31 such that the hollow 314 may reduce the wind noise when a sound is picked up.

When the user is in a motion state such as riding or running, wind blows head-on with respect to the user and flows around sides of the user's head where ears are located, that is, the wind blows roughly along a side of the wearing member 30 away from the user's head. Since the first sound pickup hole 310 is disposed at the hollow 314 of the concave section 312, the concave section 312 may have a good blocking effect on airflow entering the hollow 314, that is, a wind speed outside the hollow 314 may be relatively higher, while a wind speed inside the hollow 314 may be less affected by the airflow outside the hollow 314 due to the blocking of the concave section 312. In such cases, by setting the first sound pickup hole at the hollow 314, the sound picked up at the first pickup hole 310 initially may have less wind noise, which may improve the quality of the sound.

In the wearing state, the concave section 312 is disposed in front of the ear, and the concave section 312 extends relatively toward the opening of the ear canal such that the first sound pickup hole 310 may be closer to the opening of the ear canal, and the sound picked up by the first sound pickup hole 310 may be closer to a sound heard near the ear canal. In such cases, the user is relatively more comfortable in a voice call or voice control. For example, in different noise environments, the user may adjust his/her own volume according to a volume heard by the ears, which in turn enables the user to hear his/her own voice clearly such that the first sound pickup hole 310 may pick up the sound more clearly.

Furthermore, after passing through the first sound pickup hole 310, the sound may further pass through the noise-reducing channel 320 of the noise-reducing member 32 to be transmitted to the first sound pickup member 33, wherein the noise-reducing member 32 may further reduce the wind noise of the sound transmitted therein.

In some embodiments, the first sound pickup hole 310 is disposed at a bottom of the hollow 314. The bottom of the hollow 314 is least affected by the wind speed outside the hollow 314 such that the sound input by the first sound pickup hole 310 disposed at the bottom may have minimum wind noise.

Optionally, the first sound pickup hole 310 may further be disposed at a waist of the hollow 314.

Further, the concave section 312 includes a first side 316 and a second side 317 spaced apart from each other. In the wearing state, the first side 316 faces the user's head, the second side 317 faces away from the user's head, and a distance between the first sound pickup hole 310 and the first side 316 is smaller than a distance between the first sound pickup hole 310 and the second side 317. That is, the first sound pickup hole 310 is disposed closer to the first side0 316, which is farther away from the airflow outside the hollow 314, and less wind noise may be generated due to the airflow, thereby picking up a sound with improved quality.

Figure 6:
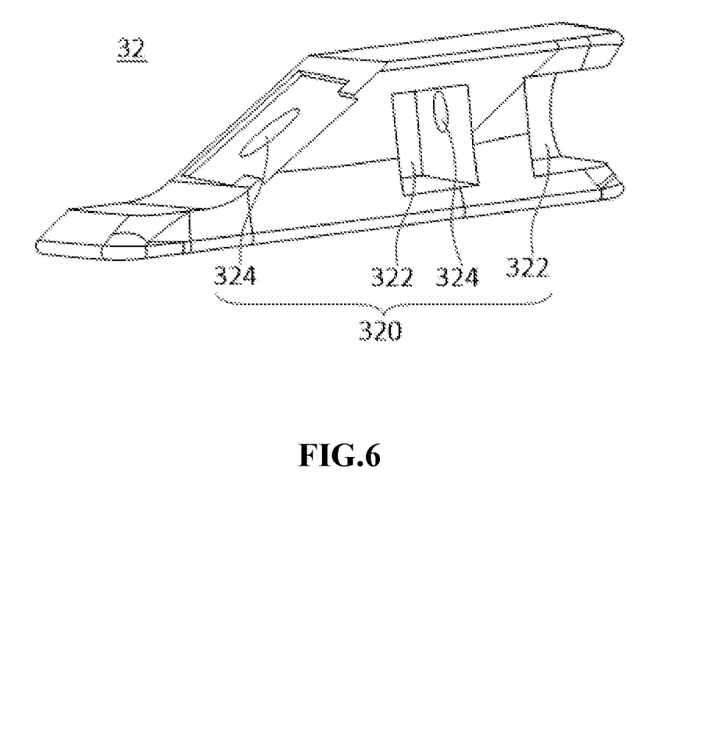
FIG. 6 is a schematic diagram illustrating an exemplary noise-reducing member in the wearing member shown in FIG. 5.
Figure 7:
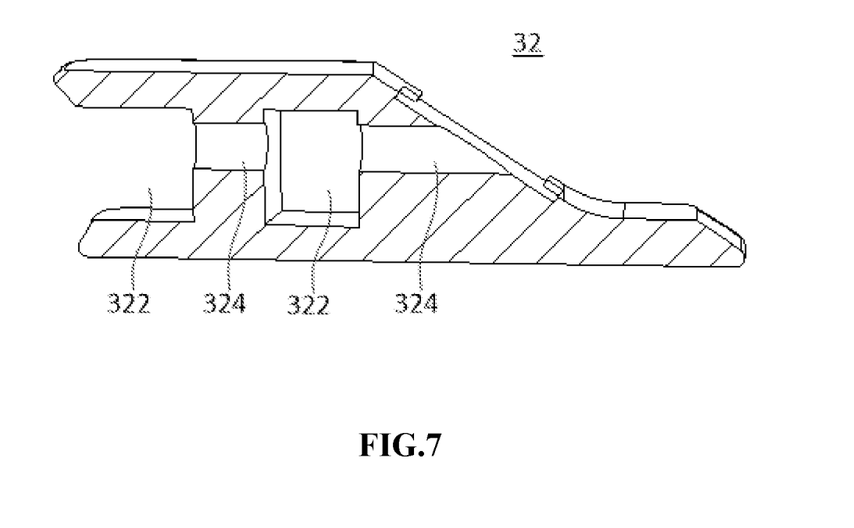
FIG. 7 is a schematic diagram illustrating an exemplary sectional structure of the noise-reducing member shown in FIG. 6.

Referring to FIG. 5 to FIG. 7, FIG. 6 is a schematic diagram illustrating an exemplary structure of the noise-reducing member in the wearing member shown in FIG. 5, and FIG. 7 is a schematic diagram illustrating an exemplary sectional structure of the noise-reducing member shown in FIG. 6.

The noise-reducing channel 320 includes one or more noise-reducing chambers 322 and a transmission channel 324 connecting the one or more noise-reducing chamber 322. A size of a cross portion of a noise-reducing chamber 322 perpendicular to an extension direction of the noise-reducing channel 320 may be greater than a size of a cross portion of the transmission channel 324, that is, when the sound passes through the noise-reducing channel 320, when the sound enters the one or more sound-reducing chamber 322 through the transmission channel 324, the sound enters a relatively larger space from a relatively smaller space, energy of the sound may attenuate such that the wind noise generated during a sound transmission may be reduced and the quality of the sound picked up by the first sound pickup member 33 may be improved.

The noise-reducing member 32 may include at least two noise-reducing chambers 322 spaced apart from each other, and the at least two noise-reducing chambers 322 may communicate with each other through the transmission channel 324 such that the sound may undergo at least two energy attenuations when passing through the noise-reducing channel 320, thereby reducing the wind noise more effectively.

A ratio of a length of the at least two noise-reducing chambers along the extension direction of the noise-reducing channel 320 to a length of the transmission channel 324 between two adjacent noise-reducing chambers 322 along the extension direction of the noise-reducing channel 320 may be greater than or equal to 1.5, which may cause the wind noise to be reduced more effectively in the noise-reducing chamber 322. As used herein, the length of the at least two noise-reducing chambers refers to a sum of a length of each of the at least two noise-reducing chambers.

For example, a count of the noise-reducing chamber 322 may be two, three, or four, and they communicate with each other through the transmission channel 324. The transmission channel 324 may further communicate with the noise-reducing chamber 322 and the first sound pickup member 33. The transmission channel 324 may further communicate with the noise-reducing chamber 322 and the first sound pickup hole 310.

Optionally, the noise-reducing channel 320 may further include one noise-reducing chamber 322 disposed at a middle portion or an end of the noise-reducing channel 320, etc., which is not specifically limited herein.

In some embodiments, the noise-reducing channel 320 includes two noise-reducing chambers 322, wherein one noise-reducing chamber 322 is formed at an end of the noise-reducing member 32 and forms an end opening at the end of the noise-reducing member 32. The end of the noise-reducing chamber 322 abuts against an inner wall of the concave section 312 such that the sound input through the first sound pickup hole 310 may directly enter the noise-reducing chamber 322. Another noise-reducing chamber 322 is disposed at a middle portion of the noise-reducing channel 320. The noise-reducing channel 324 may also have two portions, wherein one portion of the noise-reducing channel 324 communicates with the two noise-reducing channels 322, and the other portion of the noise-reducing channel 324 communicates with the noise-reducing channel5 322 in a middle portion and the first sound pickup member 33.

At the same time, since the wearing member 30 is a glass leg structure, a space size of the concave section 312 on the glass leg structure is extremely limited. In such cases, the noise-reducing chamber 322 is disposed at the end the noise-reducing member 32 and forms the end opening, which may facilitate the docking of the noise-reducing member 32 with the first sound pickup hole 310, help to relatively shorten a length of the noise-reducing member 32 such that the noise-reducing member 32 may be more suitable to be installed in the concave section 312, and is also conducive to setting more noise-reducing chambers 322 on the noise-reducing member 32.

Optionally, the noise-reducing chamber 322 further accommodates a porous layer (not shown in the figures); and/or, the porous layer is disposed inside the transmission channel 324; and/or, the noise-reducing member 32 is a porous body. Both the porous layer and the porous body may further reduce the wind noise.

The porous layer may be made of materials such as cotton or fiber, and there are a plurality of hole segments formed thereon, which may absorb the wind noise while transmitting the sound. The porous body may include a porous ceramic body or a porous glass body, which may also reduce the wind noise.

The noise-reducing chamber 322 forms a lateral opening on a side of the noise-reducing member 32. The noise-reducing member 32 abuts against the inner wall of the housing 31 to cover the lateral opening of the noise-reducing chambers 322 such that the inner wall of the housing 31 forms a portion of the noise-reducing chambers 322. In such cases, a thickness or width of the noise-reducing member 32 may be relatively reduced, that is, a size of the noise-reducing member 32 may be thinned such that the space occupied by the noise-reducing member 32 in the housing 31 may be smaller, which is conducive to thinning and reducing a weight of the wearing member 30 and making a structure of the wearing member 30 more compact.

Optionally, the noise-reducing chamber 322 forms a lateral opening on a side of the noise-reducing member 32. The wearing member 30 further includes a speaker 34 disposed in the concave section 312 of the housing 31 and attached to a side of the noise-reducing member 32 to cover the lateral opening of the noise-reducing chambers 322, thereby reducing the size of the noise-reducing member 32.

Optionally, the noise-reducing chambers 322 form lateral openings on an inner wall facing the housing 31 and a side of the speaker 34, respectively such that the width and thickness of the noise-reducing member 32 may be relatively reduced at the same time, making the noise-reducing member 32 occupying a smaller space in the housing 31.

In other embodiments, the noise-reducing member 32 may not form the lateral opening.

In some embodiments, as shown in FIG. 3 and FIG. 4, the concave section 312 includes a first bending portion 3121 and a second bending portion 3122 connected through a bending connection. A top wall of the first bending portion 3121 and a top wall of the second bending portion 3122 cooperate to form the hollow 314. As used herein, the top wall of the first bending portion 3121 and the top wall of the second bending portion 3122 refers to portions of a top wall 318 of the housing 31 located on the first bending portion 3121 and the second bending portion 3122, respectively. In the wearing state, the top wall 318 of the housing 31 may face or approximately face the top of the user's head. The first side 316 and the second side 317 are connected to two side edges of the top wall of the first bending portion 3121 and the top wall of the second bending portion 3122, respectively. That is, the first side 316 and the second side 317 are connected to two side edges of the top wall 318 of the housing 31. The first side 316 and the second side 317 are opposite to each other. In other words, the hollow 314 is roughly V-shaped, and the first sound pickup hole 310 is disposed at a bottom of the V-shaped hollow 314.

The bending connection may be understood as that extension directions of the first bending portion 3121 and the second bending portion 3122 are different, or that the first bending portion 3121 and the second bending portion 3122 may be disposed with an angle.

As shown in FIG. 5, the noise-reducing member 32 and the first sound pickup member 33 are both disposed in the first bending member 3121, and the speaker 34 is disposed in the second bending portion 3122. The wearing member 30 further includes a controller (not shown in the figures) disposed in the first bending portion 3121. The speaker 34 and the controller are located on both sides of the noise-reducing member 32, and the speaker 34 and the first sound pickup member 33 both are electrically connected to the controller.

The controller is configured to convert a sound signal picked up by the first sound pickup member 33 into an electric signal, and control the speaker 34 to output a sound, wherein a sound guiding hole is disposed at one end of the second bending portion 3122 facing the opening of the ear canal.

As shown in FIG. 3 and FIG. 5, the housing 31 further includes a second sound pickup hole 315. The wearing member 30 includes a second sound pickup member 35, the second sound pickup member 35 is disposed in the housing 31 and is configured to pick up a sound through the second sound pickup hole 315. An orientation of the second sound pickup hole 315 is different from an orientation of the first sound pickup hole 310 to obtain an environmental noise through the second sound pickup hole 315. In such cases, the environmental noise may be removed according to a noise-reducing algorithm based on the sounds obtained through the first sound pickup hole 310 and the second sound pickup hole 315.

Specifically, the second sound pickup hole 315 is disposed at one end of the second bending portion 3122 away from the first bending portion 3121. In the wearing state, the second sound pickup hole 315 faces a side away from the user's head, and the first sound pickup hole 310 faces upward toward a top of the user's head. The first sound pickup member 33 and the second sound pickup member 35 may be electrically connected to the controller. The controller performs a noise reduction operation according to sound signals obtained by the first sound pickup member 33 and the second sound pickup member 35, respectively to eliminate the environmental noise. In such cases, the user may obtain better call quality and voice control and improving the performance of the wearable device 100.

The wearing member 30 further includes a circuit board 37 and a battery 38, the circuit board 37 is disposed in the housing 31, and the battery 38 is disposed on the first connecting section 311. The battery 38, the controller, the first sound pickup member 33, the second sound pickup member 35, and the speaker 34 are electrically connected to the circuit board 37.

By disposing the first sound pickup hole 310 at the hollow 314 of the concave section 312, a protective structure formed by the concave section 312 at the hollow 314 may be obtained such that the first sound pickup hole 310 located at the hollow 314 may be less affected by the airflow outside the hollow 314 and the sound input through the first sound pickup hole 310 may also be less affected by the wind noise caused by the airflow. That is, a wind noise interference during a sound pickup may be relatively weakened, thereby improving the quality of sound pickup and improving the voice control efficiency of a user to the wearing member or call quality of the wearing member 30.

The noise-reducing member and the first sound pickup member are disposed in the housing of the wearing member, wherein one end of the noise-reducing channel of the noise-reducing member communicates with the first sound pickup hole on the housing, and the other end of the noise-reducing channel communicates with the first sound pickup member, that is, the first sound pick-up member picks up the sound passing through the first sound pickup hole using the noise-reducing channel. In such cases, the noise-reducing channel may be used to weaken the wind noise interference, which may improve the quality of the picked-up sound, thereby improving the voice control efficiency or call quality for the user.

The above are embodiments of the present disclosure and do not limit the patent scope of the present disclosure. Any equivalent structure or equivalent process conversion made by using the present disclosure and drawings of the present disclosure, or directly or indirectly used in other related technologies fields, are all included in the scope of patent protection of the present disclosure in the same way.

What is claimed is:

1. A wearing member, comprising:
   a housing, including a concave section, the concave section forms a downward hollow in a wearing state, and the hollow includes a first sound pickup hole for an input of a sound; and
   a first sound pickup member disposed in the concave section and configured to pick up the sound input through the first sound pickup hole.

2. The wearing member of claim 1, wherein the first sound pickup hole is disposed at a bottom of the hollow; or
   the first sound pickup hole is disposed at a waist of the hollow.

3. The wearing member of claim 1, wherein the concave section includes a first bending portion and a second bending portion connected through a bending connection, and the hollow is formed between a top wall of the first bending portion and a top wall of the second bending portion; and
   the concave section further includes a first side and a second side which are connected to two side edges of the top wall of the first bending portion and the top wall of the second bending portion and are opposite to each other, and a distance between the first sound pickup hole and the first side is smaller than a distance between the first sound pickup hole and the second side;
   wherein the first side is configured to face a user's head.

4. The wearing member of claim 1, wherein the wearing member further includes a noise-reducing member, the noise-reducing member is disposed in the concave section and includes a noise-reducing channel, one end of the noise-reducing channel being aligned with the first sound pickup hole; and the first sound pickup member is aligned with another end of the noise-reducing channel.

5. The wearing member of claim 4, wherein the noise-reducing channel includes one or more noise-reducing chambers and a transmission channel connecting the one or more noise-reducing chambers, a size of a cross section of a noise-reducing chamber of the one or more noise-reducing chambers perpendicular to an extension direction of the noise-reducing channel is larger than a size of a cross section of the transmission channel.

6. The wearing member of claim 5, wherein the one or more noise-reducing chambers of the noise-reducing member include at least two noise-reducing chambers spaced apart from each other, and the at least two noise-reducing chambers communicate with each other through the transmission channel.

7. The wearing member of claim 6, wherein a ratio of a length of two adjacent noise-reducing chambers of the at least two noise-reducing chambers along the extension direction of the noise-reducing channel to a length of the transmission channel between the two adjacent noise-reducing chambers along the extension direction of the noise-reducing channel is greater than or equal to 1.5.

8. The wearing member of claim 5, wherein a noise-reducing chamber of the one or more noise-reducing chambers is disposed on one end of the noise-reducing member, the noise-reducing chamber forms an end opening at the end of the noise-reducing member, and the end of the noise-reducing member abuts against an inner wall of the concave section such that the sound input through the first sound pickup hole directly enters the noise-reducing chamber.

9. The wearing member of claim 5, wherein a noise-reducing chamber of the one or more noise-reducing chambers forms a lateral opening on a side of the noise-reducing member, and the noise-reducing member abuts against an inner wall of the housing to cover the lateral opening of the noise-reducing chamber.

10. The wearing member of claim 5, wherein the noise-reducing chamber further accommodates a porous layer; and/or, the porous layer is disposed inside the transmission channel;

and/or, the noise-reducing member is a porous body.

11. The wearing member of claim 4, wherein a second sound pickup hole is further disposed on the housing, the wearing member includes a second sound pickup member, and the second sound pickup member is disposed in the housing and is configured to pick up the sound through the second sound pickup hole;

wherein an orientation of the second sound pickup hole is different from an orientation of the first sound pickup hole.

12. The wearing member of claim 4, wherein the first sound pickup hole is disposed on the bottom of the hollow, and the noise-reducing member and the first sound pickup member are both disposed in the first bending portion; and the wearing member further includes a speaker and a controller, the speaker is disposed in the second bending portion, the controller is disposed in the first bending portion, and the speaker and the controller are located on two sides of the noise-reducing member and the first sound pickup member, respectively; both the speaker and the first sound pickup member are electrically connected to the controller.

13. The wearing member of claim 12, wherein one end of the second bending portion away from the first bending portion includes a second sound pickup hole, the wearing member includes a second sound pickup member, the second sound pickup member is disposed in the second bending portion and is located at one end of the speaker away from the first sound pickup member, and the second sound pickup member is configured to pick up the sound through the second sound pickup hole;

wherein an orientation of the second sound pickup hole is different from an orientation of the first sound pickup hole.

14. A wearable device, comprising a visual member and a wearing member, the wearing member being connected to the visual member, wherein the wearing member includes:

a housing, including a concave section, the concave section forms a downward hollow in a wearing state, and the hollow includes a first sound pickup hole for an input of a sound; and a first sound pickup member disposed in the concave section and configured to pick up the sound input through the first sound pickup hole.

15. The wearable device of claim 14, wherein the first sound pickup hole is disposed at a bottom of the hollow; or the first sound pickup hole is disposed at a waist of the hollow.

16. The wearable device of claim 14, wherein the concave section includes a first bending portion and a second bending portion connected through a bending connection, and the hollow is formed between a top wall of the first bending portion and a top wall of the second bending portion; and the concave section further includes a first side and a second side which are connected to two side edges of the top wall of the first bending portion and the top wall of the second bending portion and are opposite to each other, and a distance between the first sound pickup hole and the first side is smaller than a distance between the first sound pickup hole and the second side;

wherein the first side is configured to face a user's head.

17. The wearable device of claim 14, wherein the wearing member further includes a noise-reducing member, the noise-reducing member is disposed in the concave section and includes a noise-reducing channel, one end of the noise-reducing channel being aligned with the first sound pickup hole; and the first sound pickup member is aligned with another end of the noise-reducing channel.

18. The wearable device of claim 17, wherein the noise-reducing channel includes one or more noise-reducing chambers and a transmission channel connecting the one or more noise-reducing chambers, a size of a cross section of a noise-reducing chamber of the one or more noise-reducing chambers perpendicular to an extension direction of the noise-reducing channel is larger than a size of a cross section of the transmission channel.

19. The wearable device of claim 17, wherein a second sound pickup hole is further disposed on the housing, the wearing member includes a second sound pickup member, and the second sound pickup member is disposed in the housing and is configured to pick up the sound through the second sound pickup hole;

wherein an orientation of the second sound pickup hole is different from an orientation of the first sound pickup hole.

20. The wearable device of claim 17, wherein the first sound pickup hole is disposed on the bottom of the hollow, and the noise-reducing member and the first sound pickup member are both disposed in the first bending portion; and
the wearing member further includes a speaker and a controller, the speaker is disposed in the second bending portion, the controller is disposed in the first bending portion, and the speaker and the controller are located on two sides of the noise-reducing member and the first sound pickup member, respectively; both the speaker and the first sound pickup member are electrically connected to the controller.

\* \* \* \* \*